United States Patent [19]

Py et al.

[11] Patent Number: 5,280,509
[45] Date of Patent: Jan. 18, 1994

[54] DEVICE FOR COOLING THE CORE AND PROTECTING THE CONCRETE STRUCTURE OF A NUCLEAR REACTOR OF WHICH THE CORE HAS BEGUN TO MELT AS THE RESULT OF AN ACCIDENT

[75] Inventors: Jean-Pierre Py, Viroflay; Claude Malaval, Antony, both of France

[73] Assignee: Framatome, Courbevoie, France

[21] Appl. No.: 946,670

[22] Filed: Sep. 18, 1992

[30] Foreign Application Priority Data

Sep. 20, 1991 [FR] France ................... 91 11654

[51] Int. Cl.⁵ ............................................. G21C 9/016
[52] U.S. Cl. ................................................. 376/280
[58] Field of Search .............. 376/280; 976/DIG. 143

[56] References Cited

U.S. PATENT DOCUMENTS

| | | | |
|---|---|---|---|
| 3,607,630 | 9/1971 | West et al. | 376/280 |
| 4,003,785 | 1/1977 | Rau et al. | 376/280 |
| 4,121,970 | 10/1978 | Albrecht et al. | 376/280 |
| 4,342,621 | 8/1982 | Keating, Jr. | 376/280 |
| 4,464,333 | 8/1984 | Wohlsen | 376/280 |

FOREIGN PATENT DOCUMENTS

| | | |
|---|---|---|
| 2625357 | 12/1977 | Fed. Rep. of Germany . |
| 2383505 | 10/1978 | France . |
| WO88/09998 | 12/1988 | PCT Int'l Appl. . |
| 2236210 | 3/1991 | United Kingdom . |

*Primary Examiner*—Daniel D. Wasil
*Attorney, Agent, or Firm*—Pollock, Vande Sande & Priddy

[57] ABSTRACT

The reactor comprises a vessel (3) containing the core of the reactor (4) and arranged with its axis vertical in a vessel well (2). The cooling and protection device (11) rests on the bottom of the vessel well. It consists of a metal floor (11) which covers the bottom of the vessel well (5) and in which are made channels (20) for cooling by circulation of a cooling fluid. The cooling fluid supply is connected to the cooling channels (20).

8 Claims, 5 Drawing Sheets

DEVICE FOR COOLING THE CORE AND PROTECTING THE CONCRETE STRUCTURE OF A NUCLEAR REACTOR OF WHICH THE CORE HAS BEGUN TO MELT AS THE RESULT OF AN ACCIDENT

FIELD OF THE INVENTION

The invention relates to a device for cooling the core and protecting the concrete structure of a nuclear reactor of which the core has begun to melt as the result of an accident.

BACKGROUND OF THE INVENTION

Pressurized-water nuclear reactors comprise a vessel of generally cylindrical shape containing the core of the reactor and arranged with its axis vertical in a cylindrical vessel well having a lower bottom aligned with the vessel. The core of the nuclear reactor is cooled by pressurized water circulating in the primary circuit of the reactor and on the inside of the vessel in contact with the fuel assemblies.

In some accidents occurring in the nuclear reactor and resulting in a loss of the core-cooling function, it is necessary, in view of the very serious potential consequences, and despite the remote likelihood of such an event, to consider the possibility that the emergency injection circuits of the reactor could not be put into operation. Such a failure could precipitate a sequence leading to meltdown of the core in the absence of cooling water, followed by destruction of the vessel bottom by break-through and the flow of the mass of melting core and the materials surrounding the core into the concrete well holding the reactor vessel. Contact between the molten mass of fuel and materials surrounding the fuel, called corium, the temperature of which can reach 2500 to 2800° C., and the bottom of the concrete vessel well in the absence of cooling can bring about the complete destruction of the bottom of the well. The corium can then penetrate into the raft of the containment of the reactor, destroy this raft and contaminate the groundwater tables present in the ground at the site of the nuclear reactor. The advance of the corium into the ground can stop only when the residual power of the corium has decreased to a sufficient extent.

Various devices for preventing contact between the corium and the bottom of the concrete vessel well have been proposed.

The known devices generally make it possible to spread the mass of corium over a particular area, so that the power to be dissipated per unit area is as low as possible and is compatible with the possibilities for cooling by fluids. It has been proposed, for example, to recover and contain the corium in a metal pouch lined internally with refractory materials, partial fusion of which absorbs energy in a transient manner and makes available a sufficient length of time in which to submerge the metal pouch in a mass of water on the outside, in order to dissipate the residual power of the corium by boiling of the mass of water.

The disadvantage of this device stems from the fact that refractory materials are usually very poor conductors of heat, the effect of this being to increase the equilibrium temperature of the corium which remains in a liquid state.

Other devices employing refractory floors cooled permanently by means of a water circuit are known. One of the disadvantages of these devices is that the cooling circuit can experience failures which are liable to make it at least partially ineffective, on the other hand, the heat exchanges are not sufficiently intense to prevent the corium from remaining at a high temperature and in the liquid state after it has spilled over onto the recovery and cooling device.

There is also a known device consisting of a stack of sections placed horizontally in the bottom of the well underneath the vessel bottom, so as to form receptacles for the melted corium, in order to accomplish the dispersal of the melted mass, improve its cooling and allow it to solidify. The disadvantage of this device, however, is that it does not afford effective protection of the concrete of this vessel well when the flow of corium occurs in a localized way. The sections which are in a staggered arrangement are then liable to fill in succession with melted corium as a result of local overflowing, in such a way that the melted mass can quickly reach the bottom of the vessel well.

Finally, French Patent Application No. 91-06047 discloses a device for recovering and cooling the melting core of a nuclear reactor, making it possible to avoid any contact between the mass of the melted core and the concrete of the vessel well and to ensure cooling and rapid solidification of the melted mass. This device consists of a metal structure resting on the bottom of the vessel well and immersed in a mass of water filling the lower part of the vessel well. The metal structure comprises a central shaft, a wall for recovering and cooling the melting core and a peripheral wall.

However, the disadvantage of this device, which makes it possible to carry out quickly a spreading, cooling and solidification of the corium, is that the metal structure can be destroyed under the effect of the dynamic forces generated during the fall of the corium and the vessel bottom, these forces being capable of reaching several thousand tons.

Moreover, the cooling of the corium gives rise to the formation of an extremely high vapor flow inside the vessel well, this flow being of the order of 10,000 $m_3$/hour. The elimination of such a vapor flow into the atmosphere of the containment brings about the dispersal of fission products in the entire volume of the reactor building, this being incompatible with the safety principles which must be adhered to.

SUMMARY OF THE INVENTION

It is an object of the invention to propose a device for cooling the core and protecting the concrete structure of a nuclear reactor of which the core has begun to melt as the result of an accident, the reactor comprising a vessel of overall cylindrical shape containing the core of the reactor and arranged with its axis vertical in a vessel well having a lower bottom, on which rests the cooling and protection device consisting of a part of the reactor structure comprising a part of a raft arranged in line with the vessel, this device having a very high strength and a very great rigidity, so as to withstand the fall of the corium and the vessel bottom, and being capable of ensuring the cooling of the corium without a discharge of vapor into the reactor building.

To this end, the device according to the invention consists of a metal floor which covers the bottom of the vessel well and in which are made channels for cooling by circulation of a fluid, connected to means for suppling and removing the cooling fluid.

To aid in understanding the invention, an embodiment of a cooling and protection device according to the invention, used for a nuclear reactor cooled by pressurized water, will now be described by way of example, with reference to the accompanying drawings.

DESCRIPTION OF PREFERRED EMBODIMENT

Figure 1:
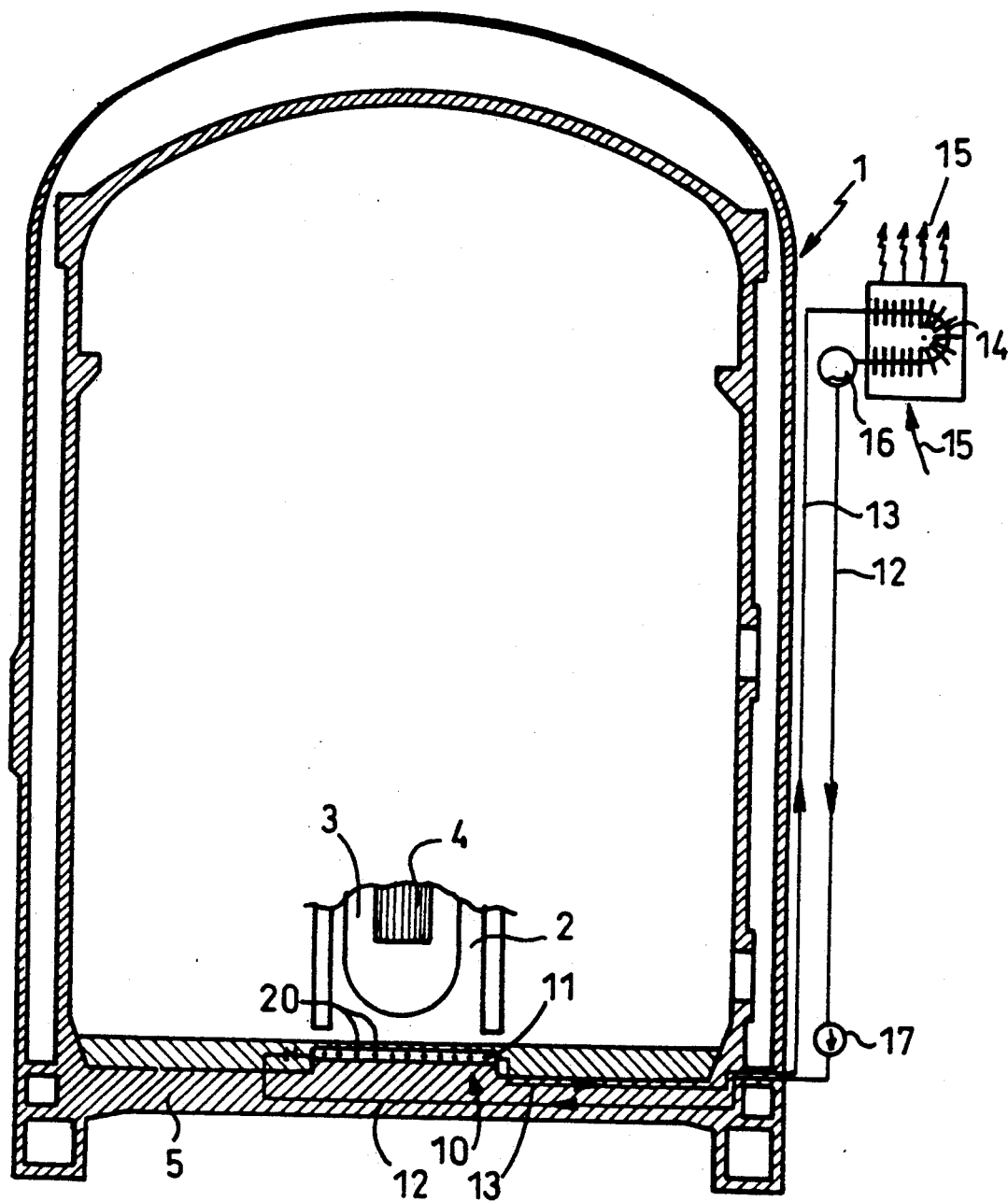
FIG. 1 is a sectional view in a vertical plane of the safety containment of a pressurized-water nuclear reactor comprising a cooling and protection device according to the invention.

FIG. 1 shows the double-shell safety containment 1 of a nuclear reactor, on the inside of which the vessel 3 containing the reactor core 4 is located in a vertical arrangement in alignment with the axis of a vessel well 2.

The lower part of the double-shell concrete safety containment 1 consists of a raft 5 resting on the ground.

The cooling and protection device 10 according to the invention consists of a metal floor 11 resting on a raised part of the raft 5 and arranged in line with the vessel well 2 underneath the bottom of the vessel 3 containing the core 4. On the inside of the floor 11 are made cooling channels which are supplied with a cooling fluid, such as water, by a cooling circuit comprising conduits 12 and 13 passing through the wall of the safety containment 1.

The cooling circuit consists of two half-circuits, each comprising conduits, such as 12 and 13, connected to the cooled floor 11, a heat exchanger 14 cooled by air (arrow 15), a reservoir 16 for the expansion and collection of the condensates coming from the exchanger 14, and a circulation pump 17.

For each of the half-circuits, the water leaving the floor by way of the conduit 13 is cooled inside the heat exchanger 14, before being returned into the floor by way of the pipe 12, as a result of the driving head resulting from the difference in the specific volumes of the water/vapor emulsion present in the conduit 13 and of the cooled water returning towards the floor by way of the conduit 12.

The functioning of the cooling and protection device according to the invention, in respect of a melting of the core 4 and of the vessel bottom, will be described in more detail hereinbelow. In outline, if the core 4 of the nuclear reactor begins to melt accidentally and causes the vessel bottom to melt, the mixture consisting of the core, the lining material and some elements of the reactor vessel, which is called corium, spreads onto the floor 11, being. The floor 11 of great thickness, is capable of catching the melted corium, without being destroyed, of affording the protection of the raft 5 and of ensuring the cooling of the corium.

The floor 11 is cooled by the circulation of water arriving by way of the feed pipes, such as 12.

The heated water or the vapor is caught by the pipe 13 at the outlet of the floor 11 and is cooled and condensed inside the exchanger 14. The cooled water is returned 4 into the cooling channels of the floor 11 by way of the conduit 12.

The cooling of the corium is therefore carried out without the emission of vapor into the containment and by the use of cooling means arranged outside the safety containment of the reactor.

The heat exchangers 14 and the reservoirs 16 of the cooling circuit are installed at a height above the horizontal mid-plane of the floor 11 which can be of the order of 25 m and which makes it possible to obtain a static pressure of the head of water in the feed conduits of the same order of magnitude as the loss of head in the cooling channels of the floor 11.

Figure 2:
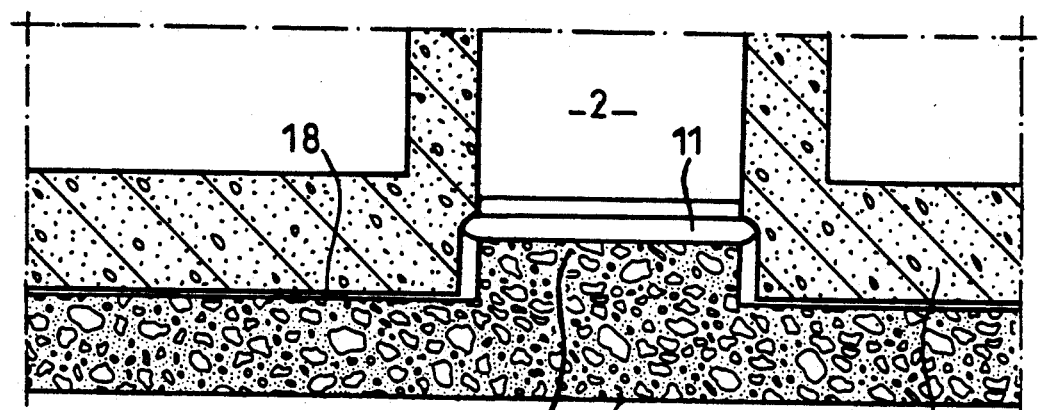
FIG. 2 is a schematic view of the lower part of the vessel well of the nuclear reactor shown in FIG. 1.
Figure 3:
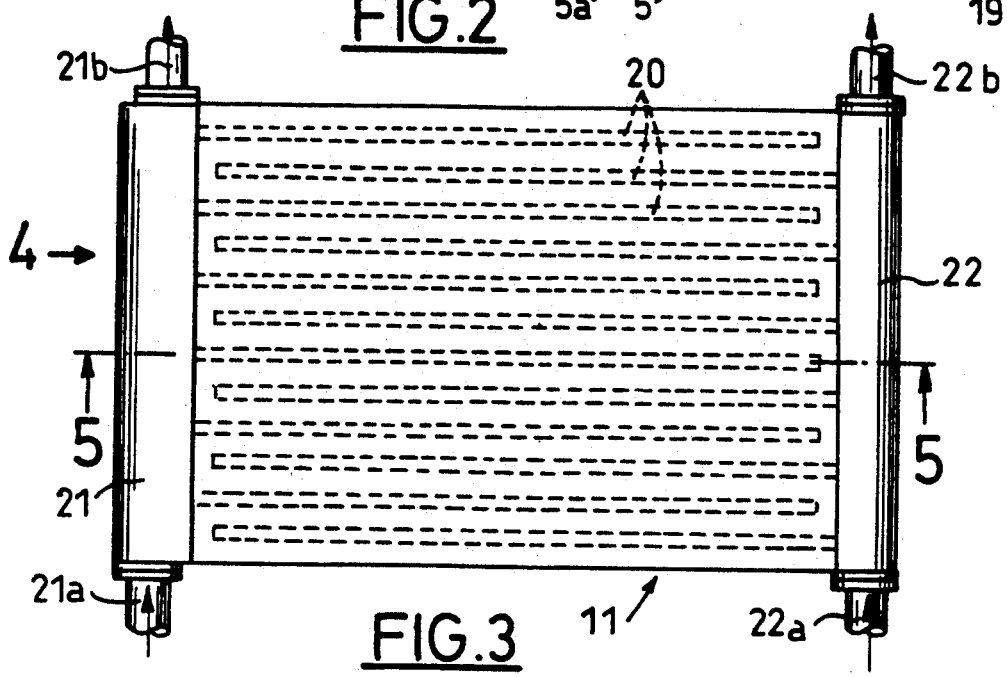
FIG. 3 is a top plan view of a metal floor forming a cooling and protection device according to the invention.
Figure 4:
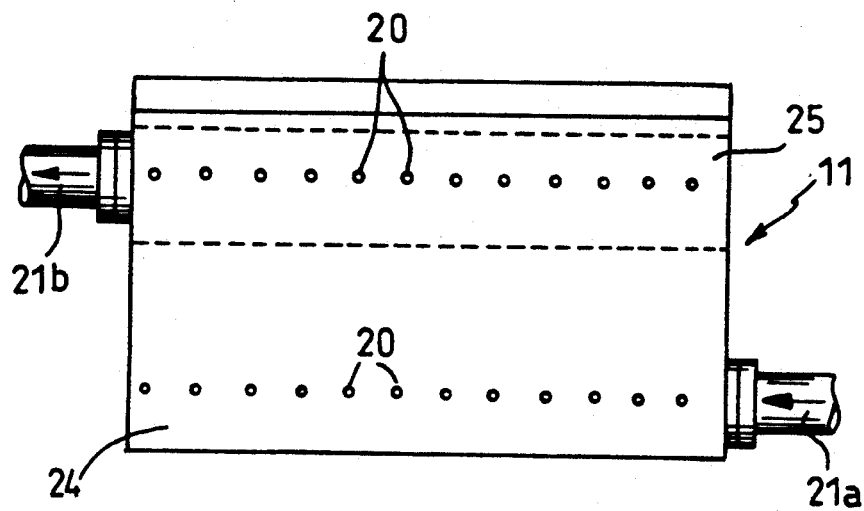
FIG. 4 is a side view in the direction of arrow 4 of FIG. 3.

FIG. 2 illustrates the part 5a of the raft 5 projecting upwards in line with the vessel well 2, and the cooled floor 11 resting on the part 5a of the raft.

A sheet-metal wall 18 or skin, which covers the upper surface of the raft 5 and on which is cast a protective layer of concrete, is connected to the outer part of the metal floor 11.

The metal floor 11 of the cooling and protection device according to the invention will now be described in more detail by reference to FIGS. 3, 4, 5 and 6 as a whole.

The floor 11 consists of a metal plate, in which cooling channels 20 are formed and which is connected at its longitudinal ends to collector assemblies 21 and 22 making it possible to ensure the supply of cooling fluid to the channels 20 and the removal of the heated and, where appropriate, evaporated cooling fluid.

The collector assembly 21 is supplied with cooling water by way of a pipe 21a and, in an opposite arrangement, is connected to a removal pipe 21b.

Likewise, the collector assembly 22 is connected at one of its transverse ends to a supply pipe 22a and at its other end to a removal pipe 22b.

Figure 5:
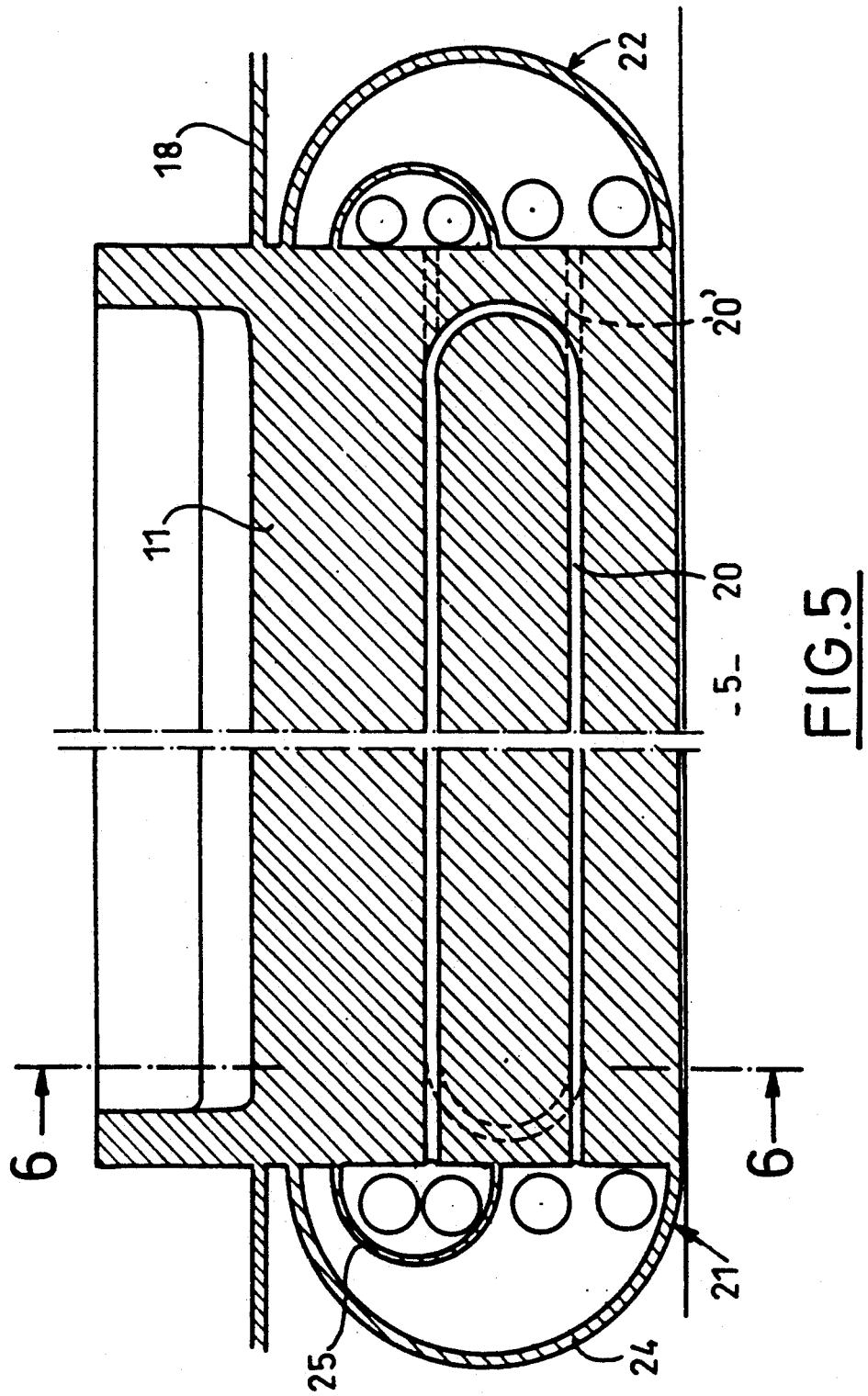
FIG. 5 is a sectional view along line 5--5 of FIG. 3

As can be seen in FIG. 5, each of the collector assemblies comprises an outer casing 24 and an inner casing 25 which are fastened by welding to the lateral faces of the solid metal floor 11.

Each of the channels 20 made in the thickness of the floor has a hairpin shape and comprises a lower branch, opening out at one of its ends inside the outer casing 24 and outside the inner casing 25 of a collector 21 (or 22), and an upper branch, opening out at one of its ends inside the inner casing 25 of one of the collectors 21 (or 22).

The successive cooling channels, such as 20, 20', arranged over the length of the cooled floor 11 open out alternately into the collector 21 or into the collector 22.

During the functioning of the device, the cooling water circulates inside each of the channels 20 between the outer supply collector 24 and the inner removal collector 25.

Figure 6:
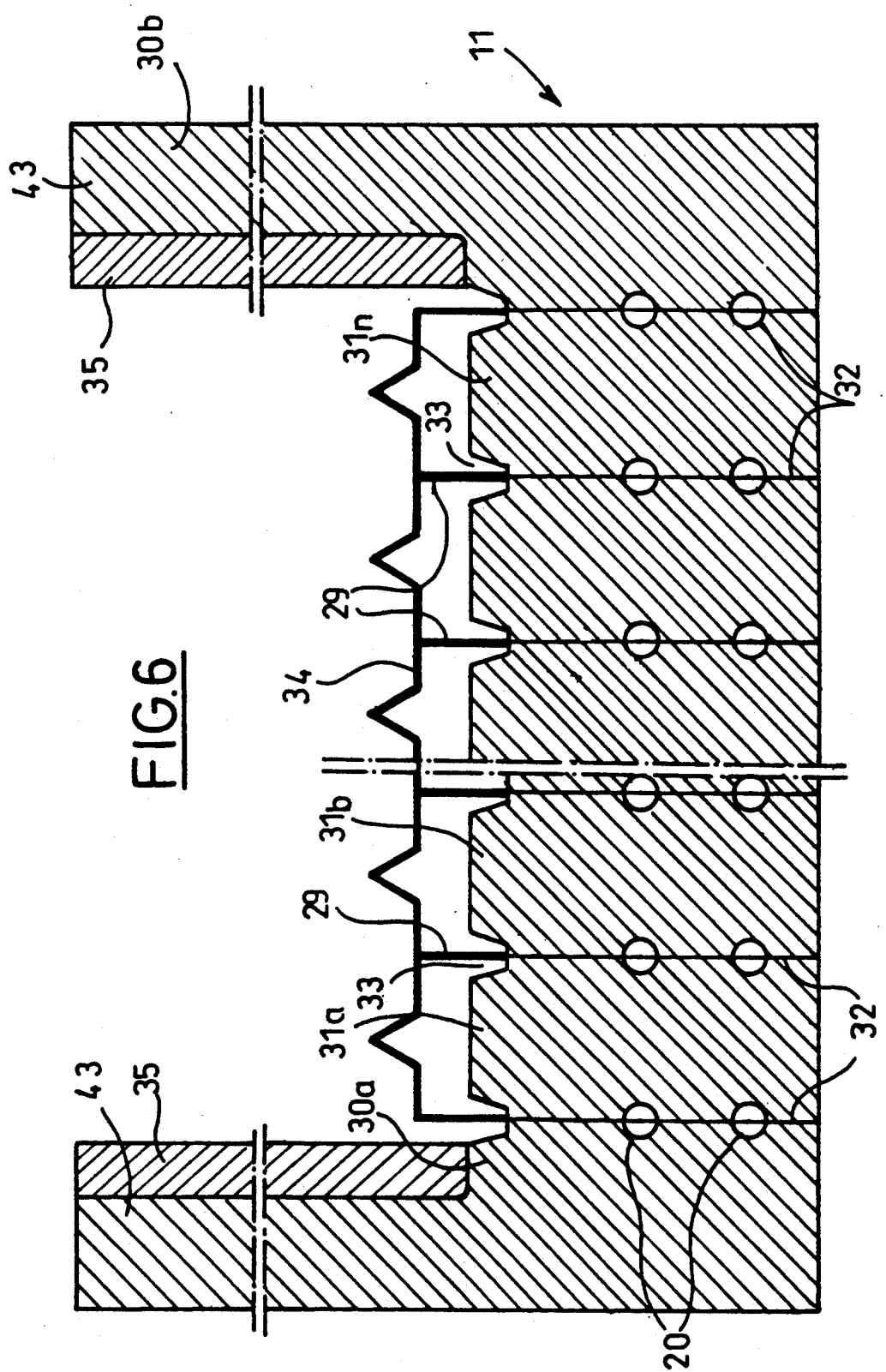
FIG. 6 is a sectional view along line 6--6 of FIG. 5.

As can be seen in FIG. 6, the metal floor 11 consists of successive blocks 30a, 31a, 31b, ..., 31n and 30b welded to one another along their lateral faces to form successive parallel joining planes 32.

The end blocks 30a and 30b have a height greater than that of the intermediate blocks 31a, 31b, 31n and comprise an upper part 43 projecting upwards in relation to the upper part of the blocks 31 and forming a parapet intended to retain the mass of melting corium on the floor 11.

The end blocks 30a and 30b comprise a face intended to be attached to and welded against a corresponding face of an intermediate block which is machined in such a way as to form, by juxtaposition with corresponding machinings of the intermediate blocks, the lower branch and upper branch of a cooling channel 20.

The intermediate blocks 31a, 31b, ..., 31n are machined on their two lateral faces which are attached to and welded against a corresponding face of another intermediate block or of an end block, to form parts of the lower and upper branches of two successive cooling channels.

The raised faces 43 of the end blocks 30a and 30b are covered with a layer of refractory material 35 intended to protect the parapet against the hot corium liable to spill onto the floor 11.

The end blocks 30a and 30b and the intermediate blocks 31a and 31n have upper parts machined in such a way that, when they have been juxtaposed, they form parallel grooves 33 in the longitudinal direction of the floor 11. These grooves 33 make it possible to assist the transfer of heat coming from the corium towards the cooling channels 20 and to form traps which hold the corium while it is cooling. These grooves also facilitate the welding of the steel blocks juxtaposed in pairs.

A mechanically welded sheet-metal structure 34 is arranged above the upper surface of the intermediate blocks 31 of the floor 11, so as to protect the floor and absorb the kinetic energy generated during the fall of the corium and vessel bottom onto the floor 11 in the event of an accident resulting in $ melting of the reactor core.

The structure 34 comprises an upper part consisting of a bent metal sheet and an assembly of reinforcing plates 29 perpendicular to the upper part of the structure and each engaging into a groove 33, so as to ensure that the structure 34 is held on the floor 11.

Figure 7:
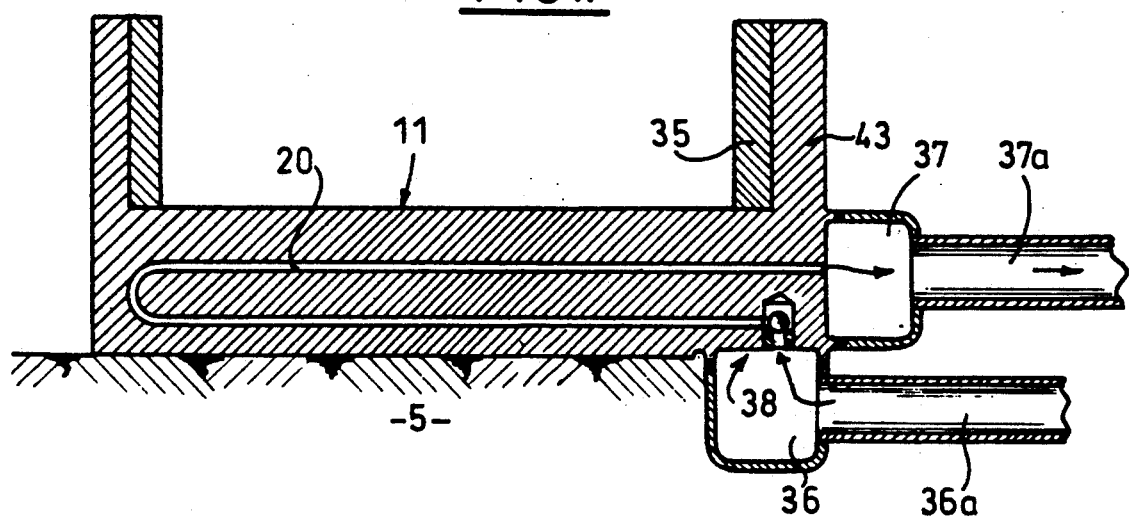
FIG. 7 is a sectional view of the metal floor produced according to an alternative embodiment, showing a cooling channel and its cooling-water supply and removal means.

As can be seen in FIG. 7 each of the hairpin-shaped cooling channels 20 arranged inside the metal floor 11 is connected by one of its ends to a supply collector 36, itself connected to a supply conduit 36a, by means of a non-return valve 38. The other end of the cooling channel 20 is connected to a removal collector 37, itself connected to a removal pipe 37a.

The supply pipes 36a and 37a are themselves connected to pipes of a cooling circuit, such as the pipes 12 and 13 illustrated in FIG. 1.

Figure 8:
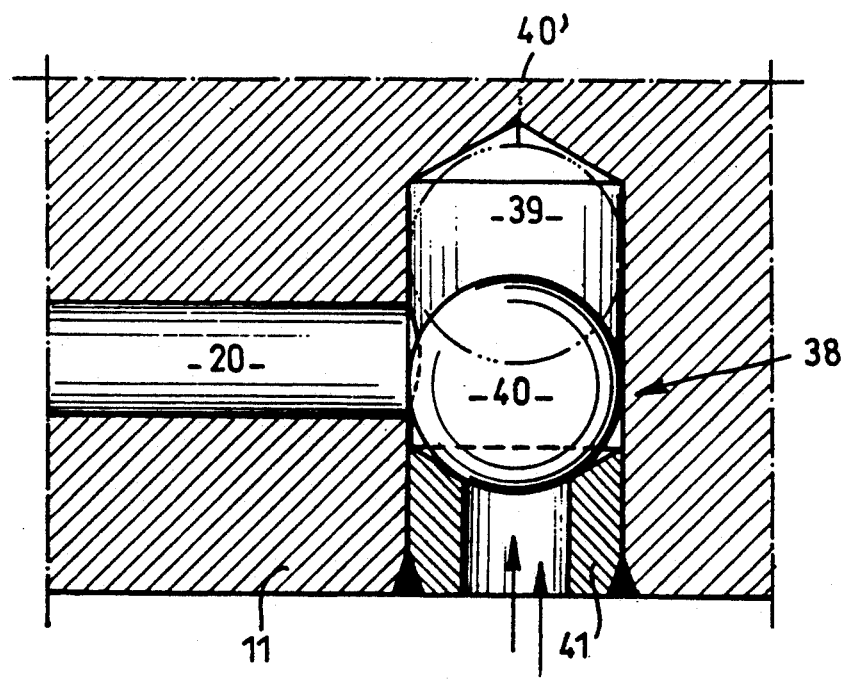
FIG. 8 is an enlarged sectional view showing a non-return valve of the cooling channel shown in FIG. 7.

FIG. 8 shows a non-return valve 38 arranged at the entrance of a cooling channel 20 formed in the floor 11.

The valve 38 comprises a chamber 39, inside which is welded a seat 41. An aluminum ball 40 comes to rest under the effect of its weight on the seat 41, so as to close the passage putting the supply chamber 36 in communication with the channel 20, when the collector 36 is not being supplied.

When the collector is being supplied, the ball 40 is lifted by the stream of cooling water into its position 40', so that the water can enter the cooling channel 20.

The cooling water circulating inside the cooling channel 20 is liable to evaporate at least partially at the start of cooling, when natural circulation has not yet been established, with the result that a water vapor emulsion passes through the channel 20.

The valve 38 make it possible to prevent the possibility that the water/vapor emulsion formed will escape by way of the supply collector 36. This water/vapor emulsion can escape only via the removal collector 37 or hot collector. Natural circulation is therefore established progressively as a result of the difference in density of the two fluid heads which thereafter keeps the valve lifted.

With regard to the cooling and protection device according to the invention used in a pressurized-water nuclear reactor, such as is built and in operation at the present time, a floor is used, of which the area which corresponds substantially to the area of the bottom of the vessel well is 66 m$^2$.

The metal floor produced from A 42 structural steel has a thickness greater than 300 mm in its central parts and comprises lateral parapets intended to retain the corium over a height of about 800 mm.

The floor 11 consists of juxtaposed blocks 30a, 30b, 31a to 31n, the length of which is about 8 m.

These blocks are machined so as to form cooling channels, the diameter of which is about 30 mm.

The floor rests on the concrete raft 5 which it protects in the region of the vessel bottom.

The floor makes it possible to catch the melting corium in the event of an accident resulting in a complete cooling failure in the reactor, this corium having a volume greater than 40 m$^3$.

The corium spilt onto the metal floor 11 occupies a height greater than 600 mm in the central part of the floor 11 between the parapets 43.

The corium produced in the event of a melting of the core can take the form of a continuous liquid medium or of partially melted fragments which spill onto the floor 11 of the cooling device in the event of an accident. At all events, the corium spreads approximately uniformly on the surface of the floor.

If the corium is a continuous melting medium, it is highly fluid and a stable solidified crust cannot form on its surface, insofar as an intense emission of heat occurs under the surface of the corium. All the highly-fluid corium therefore spreads easily o the floor. If the corium consists of fragments, localized piles of material can form on the floor, but these piles cannot attain a size resulting in a heat flux greater than that occurring in the event of a uniform distribution of liquid melting corium.

When the corium spreads on the metal floor 11, it comes into contact with the structure 34 which absorbs some of the kinetic energy accompanying the fall of the corium. The dimensions of the metal floor 11 are such as to withstand the fall of the corium, and in particular the cooling channels 20 are spaced at a distance P forming the pitch of the cooling network, the value of which is such that the structure of the cooled floor is equivalent to a solid structure capable of transmitting to the raft 5 the high loads accompanying the fall of the corium, without any appreciable deformation of the cooling channels.

When the corium, the temperature of which is about 2400° C., comes into contact with the upper surface of the floor 11, the steel of the floor melts over a small thickness and mixes with the corium. A thin crust (a few centimeters thick) forms between the corium and the steel, and thermal equilibrium is established as soon as the energy absorbed by the cooling channels 20 becomes equal to the heat emitted by the corium.

In the calculation of the dimensions of the floor and of the characteristics of the cooling system, it is assumed that the corium is completely dry and that it is therefore not cooled from the top by the evaporation of water. Moreover, the heat flux radiated in the direction of the vessel well by the corium is ignored. The circuit is designed for cooling the corium either by natural circulation or by forced circulation.

In a steady state, when a solidified crust has formed in contact with the floor, the temperature at the interface of the solidified crust and the upper surface of the floor is below the melting temperature of the steel, i.e., 1450° C. All of the heat emitted by the corium is dissipated by conduction into the solidified crust and into the metal floor.

The power released by the corium caught by the floor is of the order of 32 MW, this power being dissipated by the cooling circuit.

As soon as the corium comes into contact with the floor, the heating of the floor causes partial boiling of the water, which brings about a natural circulation if the pumps 17 are out of action.

A natural circulation of the cooling water in the channels, with partial boiling, takes place; however, the channels are so designed that there cannot be any obstruction by the vapor. The natural circulation of the cooling water commences without any intervention from outside, and the water passes through the pumps 17 of the cooling circuit.

In the longer term, for example after three days following the accident which has caused the core to melt, the two pumps 17 of the cooling circuit can be put into operation again in order to establish a forced circulation.

This results in a continuous circulation leading to accelerated cooling and to solidification of the corium spread on the floor.

The pumps 17 can be driven by thermal or electric motors.

The circulating water heats up in the lower branch of each of the cooling channels, before passing into the upper branch where it heats up, while remaining liquid in the event of forced circulation, or partially evaporating in the event of a natural circulation of a two-phase mixture.

The device according to the invention is therefore extremely reliable and allows effective protection of the raft of the reactor, insofar as the metal floor can withstand the fall of the corium, without being deformed, the circulation of the cooling fluid in the channels of the floor beginning immediately after the fall of the corium, in a passive manner.

Moreover, the long-term cooling of the corium up to its complete solidification can easily be obtained by the forced circulation of cooling water.

The cooling of the corium is carried out without vapor being generated inside the reactor building.

It is possible to use metal floors produced in a different way from that described. Instead of blocks welded to one another, component elements of the floor may be assembled together by interlocking and fastened to the raft by means of studs embedded and sealed in the raft and engaged in orifices provided in each of the elements of the floor.

The floor can have variable shapes and dimensions, depending on the characteristics of the vessel and vessel well of the reactor.

The cooling circuit of the floor can be produced in a different way from that described.

It is preferable, however, to arrange the active elements of the cooling circuit, such as the heat exchangers, on the outside of the safety containment of the reactor.

The forced circulation of the cooling fluid can be ensured by any type of circulation pump generally used in the cooling circuits of a nuclear reactor.

Finally, the cooling and protection device according to the invention can be employed in any nuclear reactor comprising a vessel containing the reactor core and arranged in a vessel well, the bottom of which consists of a part of the structure of the nuclear reactor, such as a raft.

We claim:

1. In a nuclear reactor having a concrete structure comprising a raft and defining a vessel well having a lower bottom consisting of a part of the raft and a vessel of overall cylindrical shape containing the core of the reactor arranged with its axis vertical in the vessel well, a device for cooling the core of the reactor and protecting the concrete structure of the reactor of which the core has begun to melt as the result of an accident, said device resting on the lower bottom of the vessel well in line with the vessel and consisting of a metal floor which covers the lower bottom of the vessel well and is made of blocks attached and welded to one another along vertical lateral faces, in which channels for cooling by circulation of a cooling fluid are formed by machined parts of the faces of the blocks attached against one another, said channels being connected to means for supplying and removing the cooling fluid.

2. Device according to claim 1, wherein said metal floor has longitudinal ends comprising two end blocks and intermediate blocks between said end blocks, said end blocks comprising upper parts projecting relative to an upper surface of said intermediate blocks and forming a parapet adapted to contain a melting core of said reactor when said melting core spills onto said metal floor.

3. Device according to claim 1, wherein said metal floor comprises a sheet-metal structure resting on a horizontal upper surface of said metal and spaced from said surface and adapted to absorb kinetic energy of the melting core of said reactor when said melting core spills onto said metal floor.

4. Device according to claim 3, wherein said projecting upper parts of said end blocks of said metal floor comprise mutually confronting inner faces covered with a layer of refractory material.

5. Device according to claim 1, wherein said means for supplying and removing cooling fluid comprise collectors communicating with the end parts of said cooling channels, coolingfluid supply and removal pipes and a cooling circuit comprising at least one heat exchanger and conduits connected to supply and removal pipes of said collectors for supplying and removing said cooling fluid.

6. Device according to claim 5, wherein said cooling circuit is arranged at least partially outside a safety containment forming part of said concrete structure of the reactor.

7. Device according to claim 6, wherein said cooling circuit comprises at least one heat exchanger, at least one expansion and condensation reservoir and a circulation pump arranged in series, outside said safety containment, on conduits of said cooling circuit.

8. Device according to claim 1, comprising a non-return valve arranged on the end part of each of said cooling channels connected to a cooling-fluid supply means.

* * * * *